(12) United States Patent
Haitsuka et al.

(10) Patent No.: US 7,844,491 B1
(45) Date of Patent: Nov. 30, 2010

(54) SPONSORSHIP/ADVERTISING FOR AN INTERNET CLIENT

(75) Inventors: Stacy Haitsuka, Oak Park, CA (US); Ronald Burr, Westlake Village, CA (US); Harold MacKenzie, Los Angeles, CA (US); Marwan Zebian, Agoura, CA (US); Terry Warren, Santa Ana, CA (US); Shane Blaser, Camarillo, CA (US); Colin Giffen, North Ridge, CA (US); Mark Goldston, Beverly Hills, CA (US)

(73) Assignee: NetZero, Inc., Woodland Hills, CA (US)

( * ) Notice: Subject to any disclaimer, the term of this patent is extended or adjusted under 35 U.S.C. 154(b) by 2245 days.

(21) Appl. No.: 09/632,774

(22) Filed: Aug. 4, 2000

Related U.S. Application Data

(60) Provisional application No. 60/160,556, filed on Oct. 19, 1999.

(51) Int. Cl.
*G06Q 30/00* (2006.01)

(52) U.S. Cl. ............... 705/14.4; 705/14.36; 705/14.49; 705/14.56; 705/14.73

(58) Field of Classification Search ............... 705/1, 705/10, 14, 14.36, 14.4, 14.49, 14.56, 14.73
See application file for complete search history.

(56) References Cited

U.S. PATENT DOCUMENTS

| | | | |
|---|---|---|---|
| 5,283,731 A * | 2/1994 | Lalonde et al. ............... 705/1 |
| 5,305,195 A | 4/1994 | Murphy |
| 5,347,632 A * | 9/1994 | Filepp et al. ............... 709/202 |
| 5,643,088 A | 7/1997 | Vaughn |
| 5,724,424 A | 3/1998 | Gifford |
| 5,740,549 A * | 4/1998 | Reilly et al. ............... 705/14 |
| 5,761,648 A * | 6/1998 | Golden et al. ............... 705/14 |

(Continued)

FOREIGN PATENT DOCUMENTS

EP 1 083 504 A2 3/2001

OTHER PUBLICATIONS

Rob Pegoraro. "Loggin on; How much is free access worth?" Washington Post, Oct. 8, 1998.*

(Continued)

*Primary Examiner*—Eric W Stamber
*Assistant Examiner*—Tri Nguyen
(74) *Attorney, Agent, or Firm*—SoCal IP Law Group LLP; Mark A. Goldstein; Steven C. Sereboff

(57) ABSTRACT

In accordance with the present invention, there is provided a client application for enabling access to an online service and displaying advertisements while the user is accessing the online service. The client application receives play lists from the online service provider. The play lists include information about advertisements to be played and the order of play. The client application also receives match lists from the online service provider. The match lists include information about advertisements to be played when the user performs certain actions. The client application also displays a wide variety of sponsorship information in connection with the online service. The sponsorship information is displayed in hypertext format. The client application provides the user with information related to a sponsor when the user clicks on hypertext associated with the sponsor.

10 Claims, 10 Drawing Sheets

U.S. PATENT DOCUMENTS

| | | | |
|---|---|---|---|
| 5,781,894 A * | 7/1998 | Petrecca et al. | 705/14 |
| 5,845,259 A * | 12/1998 | West et al. | 705/14 |
| 5,913,040 A * | 6/1999 | Rakavy et al. | 709/232 |
| 5,933,811 A * | 8/1999 | Angles et al. | 705/14 |
| 5,946,646 A * | 8/1999 | Schena et al. | 702/177 |
| 5,959,621 A | 9/1999 | Nawaz | |
| 5,983,196 A * | 11/1999 | Wendkos | 705/14 |
| 6,014,502 A | 1/2000 | Moraes | |
| 6,055,513 A | 4/2000 | Katz et al. | |
| 6,119,098 A * | 9/2000 | Guyot et al. | 705/14 |
| 6,222,520 B1 * | 4/2001 | Gerszberg et al. | 715/784 |
| 6,237,022 B1 | 5/2001 | Bruck et al. | |
| 6,317,761 B1 | 11/2001 | Landsman | |
| 6,363,419 B1 | 3/2002 | Martin | |
| 6,389,469 B1 | 5/2002 | Vekslar et al. | |
| 6,412,112 B1 | 6/2002 | Barrett | |
| 6,442,529 B1 | 8/2002 | Krishan | |
| 6,704,773 B1 | 3/2004 | Cohn | |
| 6,807,558 B1 * | 10/2004 | Hassett et al. | 709/203 |
| 6,892,354 B1 | 5/2005 | Servan-Schreiber | |
| 7,089,194 B1 | 8/2006 | Berstis | |
| 2002/0073421 A1 | 6/2002 | Levitan | |
| 2003/0023488 A1 | 1/2003 | Landsman | |

OTHER PUBLICATIONS

Charles Mandel. "Is this what they call "ad nauseum"?" Canadian Business, Aug. 28, 1998.*

Johnson et al., The WorldWide Web: Exploring a New Advertising Environment, CyberPsychology & Behavior, Jun. 1999, vol. 2, No. 3, pp. 195-212. (Available at http://memory.psych.mun.ca/pubs/20.shtml).

* cited by examiner

SPONSORSHIP/ADVERTISING FOR AN INTERNET CLIENT

RELATED APPLICATION INFORMATION

This application is related to the following applications, each of which is incorporated herein by reference:

(1) Application Ser. No. 09/324,747, entitled "Monitoring of Individual Internet Usage," filed Jun. 3, 1999 now U.S. Pat. No. 6,366,298;

(2) Application Ser. No. 09/349,325, entitled "System and Device for Monitoring Individual Internet Usage," filed Jul. 8, 1999 now U.S. Pat. No. 6,505,201;

(3) Application Ser. No. 09/364,544, entitled "Device for Displaying Advertisements to a User of an Online Service," filed Jul. 29, 1999;

(4) Application Ser. No. 09/393,391, entitled "Internet Server with Dynamic Ad Targeting Capabilities," filed Sep. 10, 1999;

(5) application Ser. No. 09/265,512 filed Mar. 9, 1999 entitled "Network Data Distribution Based Upon User-Specific Qualities," which is a continuation-in-part of Application No. 60/077,331 filed Mar. 9, 1998 entitled "Network Data Distribution Based Upon Geographic Location, Usage Patterns, Interactive Data, Profile Data, Demographic Data and Scheduling Information;" and (6) Application Ser. No. 09/348,411, entitled "Independent Internet Client Object with Ad Display Capabilities," filed Jul. 7, 1999.

This application claims priority from Application No. 60/160,556 filed Oct. 19, 1999 entitled "Sponsorship/Advertising for an Internet Client."

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to display advertisements to a user of an online service.

2. Description of Related Art

Online services today offer a variety of services to their users. Users may access news, weather, financial, sports, and entertainment services, participate in and retrieve information from online discussion groups, and send and receive email. A user of an online service typically accesses the service using specialized communication software (i.e., client application or client software) that establishes and manages a connection from the user's computer (or client) to the online service provider's host computers (or servers) and facilitates the user's interactions with the service.

In addition to managing the connection, there is provided software to display pages or screens relating to retrieved content according to views or presentations specific to the online service. This software may be integrated with the client application. The functionality of the content and the user interface (i.e., icons, dialog boxes, menus, etc.) for interacting with the content are typically dictated by various standards.

Interactions between the user's computer and the online service are facilitated by a variety of software protocols (i.e., communication conventions, rules and structures), including application level protocols, for managing the transfer of data across the network and to the client application on the user's computer. A protocol may be proprietary or exclusive to an online service such that only client software from the online service provider may be used to communicate with the server software. For example, an online service provider that supports electronic mail, discussion groups, chat groups, news services, etc. may define and use specific protocols for each type of service so that appropriate information is exchanged between the participants (i.e., clients and servers). Each application-specific protocol may be based on a common, underlying protocol.

The Internet and World Wide Web ("Web"), comprised of a vast array of international computer networks, many provide online service users with considerable information resources and other content. Typically, this content is accessed using a web browser, such as Microsoft Internet Explorer or Netscape Navigator, capable of understanding the HyperText Markup Language (HTML) used to create the documents found on the Web and the HyperText Transfer Protocol (HTTP) used to navigate the Web. Email and Usenet discussion groups are typically accessed through companion software to the browser. Although web browsers typically have varying levels of functionality or sophistication, retrieved content is displayed in content pages according to views or presentations specific to the web document currently presented by the web browser. Typically, the views and presentations are different than those provided by the communication software from the online service provider because the web browser is, in fact, a separate client application displaying web documents containing presentation directives.

When using a browser, the browser issues HTTP messages to request web pages. A requested web page is typically identified using its URL —uniform resource locator. The URL is a reference (or address) to a resource available on a TCP/IP network such as the Internet. A URL is composed of a character string, and may have a number of parts. These parts include a top level domain name, second level domain name, directory name, and file name. URLs may identify a file located on a web server. URLs may also point to other resources on the network such as database queries and command output. The determination and use of URLs is well known in the art and is not discussed further herein.

In some portions of this disclosure, the term "resource locator" is used. The term is defined as a string or code which uniquely identifies a resource on a network. Thus, the URL is a species of resource locator.

There are a number of types of online service providers that administer the provision of online services to users. Online services may serve the general public or may serve a limited class of individuals. Some public OSPs utilize proprietary networks; America Online and @Home are examples. Other public OSPs use the public networks, and most Internet Service Providers (ISPs) are an example. OSPs often provide Internet access. Internet access is the primary service provided by some OSPs, most notably ISPs.

Users typically connect to an OSP using a computer with a communications device such as an analog modem, an Ethernet adapter, DSL adapter or cable modem. Such connections may be analog or digital, dial-up or constantly-connected. Subscribers typically pay a fee for their subscriptions to OSPs. These fees typically are in the form of a sign-up fee, plus online charges which are fixed (i.e., unlimited monthly access for a fixed fee) or based upon the amount of time the user is connected to the online service. The fees generally increase with bandwidth.

Some online service providers have derived revenue by displaying advertisements for third parties (hereinafter, "advertisements") to users. For example, when a user accesses a web page on the Web, an advertisement may be displayed to the user as part of the web page. Advertisements are also shown to users of some proprietary online services. Typically in such systems, each user accessing a certain screen or site is shown the same advertisement. Sophisticated systems have the capability to change the advertisement after a certain period of time.

Some attempts have been made to provide advertising-supported online services, including Internet access, on a free or heavily discounted basis. Typically, these online services required the user to use a special client application for connecting to the online service. The client application typically causes an advertising window to be displayed on the user's display. This advertising window remains visible and on top of other windows throughout the entire online session. The client application receives advertisements from the online service provider, and the client application displays the advertisements in the advertising window. It is unknown to the inventors, however, whether the transmission of advertisements from the online service provider to the client application is initiated by the online service provider or the client application, how the online service determines which advertisements to send to the users, and whether such typical client applications do anything more than open the communications link with the online service and display advertisements.

In one advertising based Internet service called Bigger.net, the client application periodically requested new advertisements from an ad server. A host computer monitored the time between such requests and terminated the connection if a preset period of time was exceeded. Bigger.net also had the ability to monitor network activity, though it is unclear how this was done.

Other advertising-supported online services have included: CyberFreeway, which used a client application developed by HyperNet, Inc. of Tokyo, Japan; Juno Online, which provided free email; Tritium and Freewwweb.

Advertisers find it desirable to target advertisements to relevant potential customers. For example, an advertiser of stockings would prefer to target women rather than men with its advertising. A Boston restaurant would prefer to target residents of Boston and business travelers rather than children living in San Francisco. Moreover, advertisers prefer to pay for advertising based upon the number of relevant consumers who are actually exposed to the advertisement. For typical online systems and networks, including the Web, it is often difficult for an advertiser to precisely determine whether its advertisements were actually viewed by a user and for how long, and whether the advertisement induced a response. Accordingly, there exists a need for a targeted advertisement system that also can provide information as to the characteristics of those who were exposed to each advertisement, for how long the user was exposed, and at what times.

It is believed that the prior art advertising-supported online services did not have the ability to target advertisements. Furthermore, their client applications are believed to have been limited in capabilities.

SUMMARY OF THE INVENTION

In accordance with the present invention, there is provided a client application for enabling access to an online service and displaying advertisements while the user has access to the online service. The client application receives play lists from the online service provider. The play lists include information about advertisements to be played and the order of play. The client application also receives match lists from the online service provider. The match lists include information about advertisements to be played when the user performs certain actions. The client application provides the user with the ability to cycle back through previously displayed advertisements, and to cycle forward. The client application displays advertisements continuously while the user has access to the online service, and also preferably displays advertisements during the delay between when the client application is activated and when the user can actually use the online service.

In conjunction with the client application displaying advertisements, the client application also records which advertisements were played. The client application displays a number of icons for functions available to the user and the client application records when the user selects these and other functions. The client application also records certain pre-connection events, such as dial-up errors. The client application transmits these records to the online service provider.

The client application also displays a sponsorship label in association with various aspects of the users online experience. The sponsorship label comprises a hypertext link that identifies a sponsor that is associated with some aspect of the online experience. The hypertext link is associated with a resource locator, such as a web site URL, that is accessed when the user clicks on or otherwise selects the sponsorship label. In one embodiment, there is a sponsorship label associated with a client window.

In another embodiment, a sponsorship label is associated with an exit window that is displayed prior to terminating an online session. The exit window includes one or more exit window advertisements that are preferably displayed in accordance with a separate, exit window play list. One or more of the exit window advertisements are desirably targeted toward the user based upon the user's interaction with the online service. The client application preferably cancels termination of the online session if the user clicks on an exit window advertisement.

Still further objects and advantages attaching to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

The System of the Invention

The system of the invention enables data, such as advertisements, to be sent to users based upon: the user's geographic location; the user's interactive data; the user's network usage data; the user's personal profile information; the scheduling requirements of the data to be sent; and the demographic requirements of the data to be sent.

Figure 1:
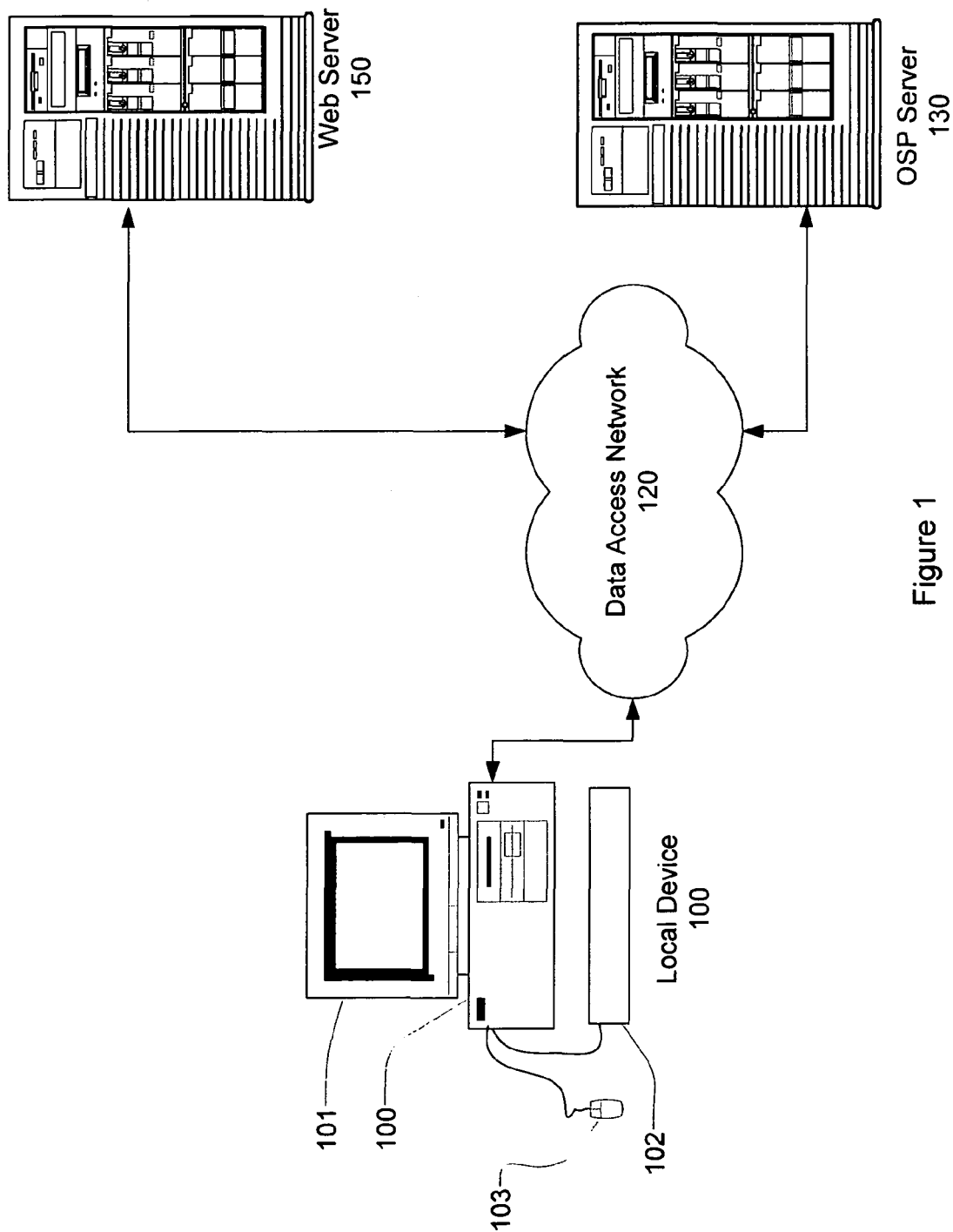
FIG. 1 is a first block diagram of a network data distribution system in accordance with the invention.

Referring now to FIG. 1, there is shown a block diagram of a network data distribution system in accordance with the invention in conjunction with a source of web pages. FIG. 1 includes a local device 100, a data access network 120, an OSP server 130 and a web server 150. The local device 100, the data access network 120 and the OSP server 130 comprise the network data distribution system. The local device 100 is provided online service to the network data distribution system under control of the OSP server 130. An online service provider controls the OSP server 130.

The local device 100 preferably comprises a client computer which is configured to access the OSP server 130 via the local access network 120. The client computer may be, for example, a PC running a Microsoft Windows operating system. The local device 100 preferably includes an output device, such as display 101, and an input device, such as keyboard 102 and/or pointing device 103 (e.g., mouse, track ball, light pen, or data glove). The local device 100 may also be, for example, an Internet appliance, network computer (NC), or an appropriately Internet-enabled device such as a portable digital assistant (PDA), mobile phone, refrigerator, etc. The particular type of device of the local device 100 is not considered to be important so long as the local device 100 can provide some measure of individual user interactivity with an online service.

The data access network 120 provides lower layer network support for the local device 100 to interact with online service, including the OSP server 130 and the web server 150.

The data access network 120 preferably comprises a common or private bi-directional telecommunications network (e.g., a public switched telephone network (PSTN), a cable-based telecommunication network, a LAN, a WAN, a wireless network), coupled with or overlaid by a TCP/IP network (e.g., the Internet or an intranet).

The web server 150 may be of the type known in the art and has the ability to serve web pages to the local device 100, as requested in the manner known in the art. It should be appreciated that the web server 150 is representative of any source of web pages available to the local device 100. Thus, for example, the web server 150 could be accessible from the Internet, or it could be a part of an intranet and represents any number of web servers.

The OSP server 130 preferably is a computer system, such as a server computer. Alternatively, the OSP server 130 may be considered to represent a number of physical devices which as a group provide the indicated network services. The OSP server 130 acts as a recipient of certain information transmitted by the local device 100, as described further below. The OSP server 130 preferably also transmits certain data to the local device 100 as described further below.

Figure 2:
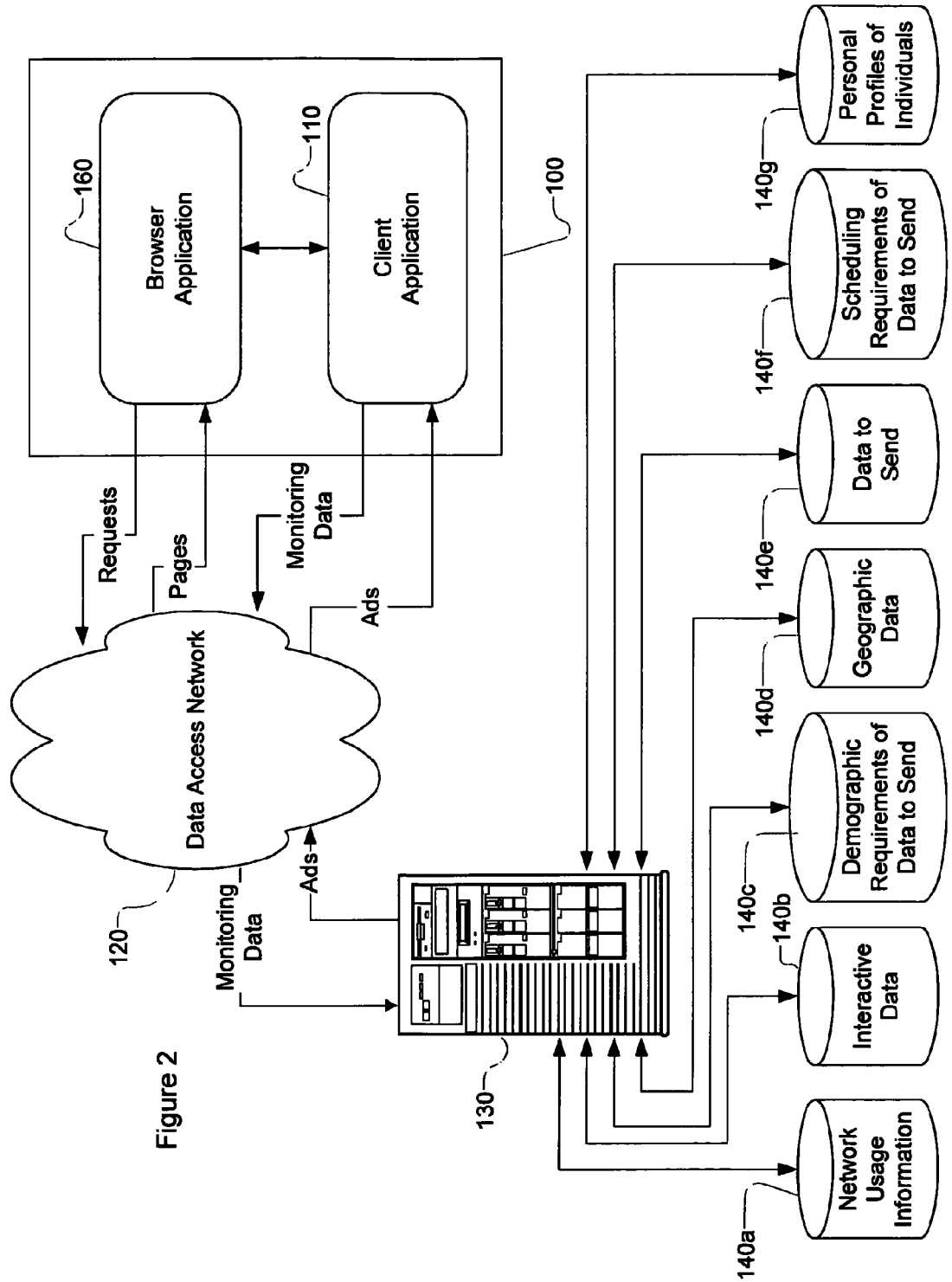
FIG. 2 is a second block diagram of a network data distribution system in accordance with the present invention.

Referring now to FIG. 2, there is shown a block diagram of a network data distribution system of an online service in accordance with the present invention. The system comprises a client application 110, the data access network 120, the OSP server 130 and one or more data stores 140, which are referred to collectively using the reference numeral 140 and individually using the suffix a, b, c, d, e, f, or, g.

A browser application 160 is also shown. A "browser application" is software which provides interactive utilization of hypertext objects located on a network, such as web pages on the Internet. As used herein, "browser application" also includes most email clients and ftp clients. The client application 110 is a program operative on local device 100, and preferably an independent application program or a DLL. The client application 110 preferably retrieves certain network data, displays certain network data, transmits geographic location data, transmits interactive user data, transmits network usage data and transmits personal profile information as described below. The client application 110 preferably also sets up and provides access to the online service. The data stores 140 store and provide this geographic information data 140d, network usage data 140a, interactive usage data 140b, personal profile information 140g, data to be sent 140e, schedule for transmitting data 140f and demographics for transmitting data 140c. Additional data stores 140 may be provided to store any of a wide variety of information related to the online service.

The browser application 160, such as Microsoft Internet Explorer or Netscape Navigator is preferably installed on the local device 100. When the local device 100 is connected to the web server 150 through the data access network 120, the user of the local device browses the web server 150 from the local device 100 using the browser application. The browser application itself need not be stored on the local device 100. The important aspect is that the user, from the local device 100, can exercise control over what web pages are requested and thus displayed by the local device 100.

Each time a user uses the local device 100 to connect to the online service, the client application 110 and the OSP server 130 establish a session. In this session, the client application 110 transmits certain information regarding the user of the local device 100 and his use of the local device 100 while connected to the online service. The OSP server 130, on the other hand, uses the information from the client application 100 to determine information which should be sent to the client application 110. Preferably, the information from the client application 110 is used by the OSP server 130 to select advertisements which the local device 100 should display. The client application 110 then causes these advertisements to be displayed on the local device's display 101.

The information from the client application 110 regarding the user preferably includes geographic data and personal profile information. Geographic data indicating the user's current location preferably is sent from the client application 110 to the OSP server 130, which then stores the geographic data in the data store 140*d*. This geographic data can be something simple, like a phone number. The user preferably provides personal profile information on a periodic basis which is stored in the data store 140*g* and used by the OSP server 130. Personal profile information is defined as any information that describes the user. This information includes (but is not limited to) geographic location information, psychological information, hobbies, interests, education level, income level, gender, age, marriage status, home address and personal interests.

The information regarding the user's use of the local device 100 includes email usage, web usage and advertisement click-throughs. The user's interactions and feedback with the web server 150 provided through the browser application 160 are preferably captured by the client application 110, analyzed by the OSP server 130 and stored in the data store 140*b*. This includes the user's feedback and responses to the data delivered to the browser application 160. The user's activities on the web server 150 provided through the browser application 160 are preferably captured by the client application 110, analyzed by the OSP server 130 and stored in the data store 140*a*. This includes the type of network data the user requests and accesses. This data is preferably summarized and classified into multiple demographic profiles.

The data to be sent to users preferably has scheduling requirements that dictate when it should be sent. These scheduling requirements include (but are not limited to): frequency, maximum number of times to send to an individual, minimum number of times to send to an individual, time of day to send, and first and last days to send. The data to be sent to users can have demographic requirements that dictate to whom it should be sent. These include (but are not limited to): personal profile, interactive data, network usage information and geographic location.

Figure 3:
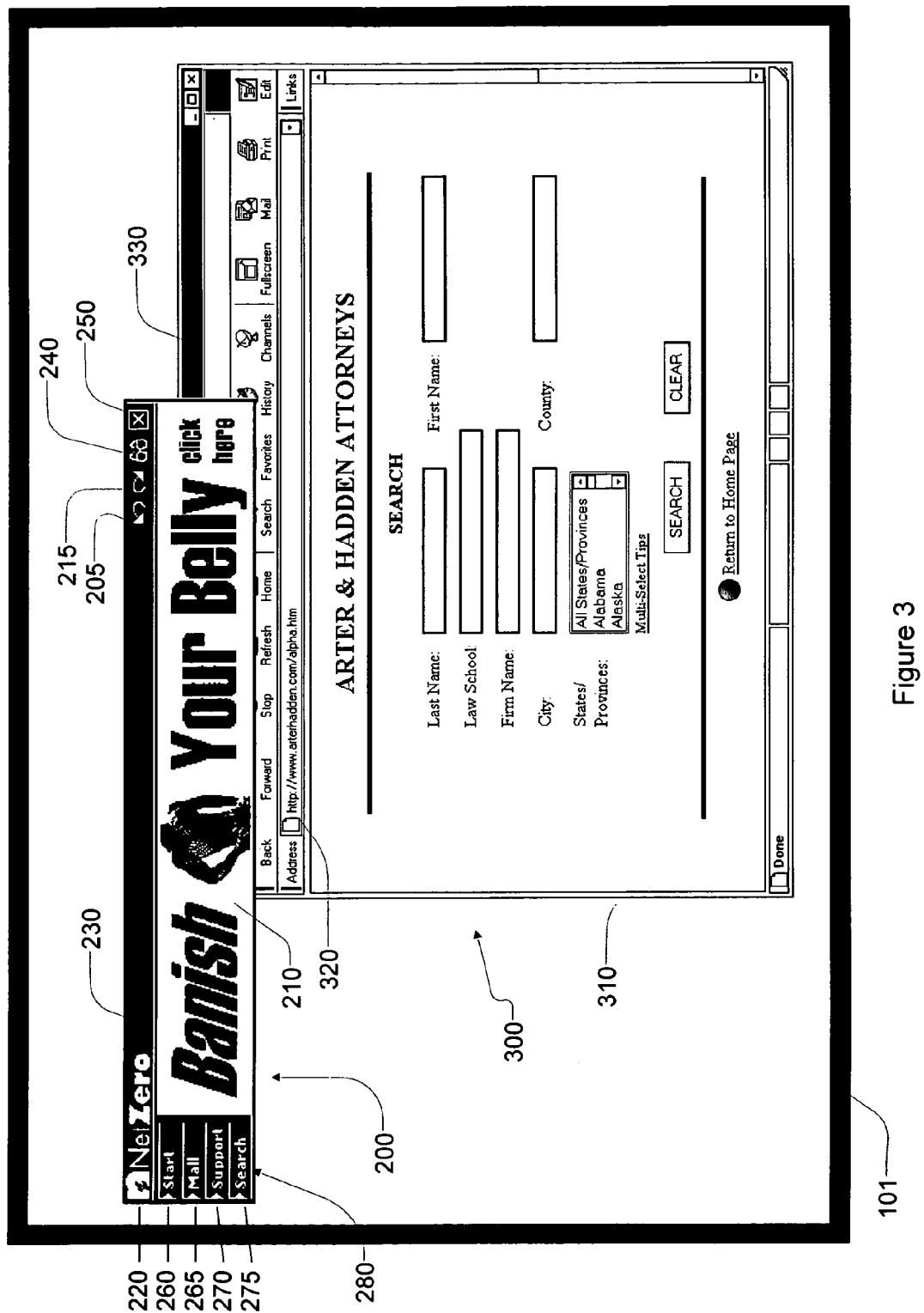
FIG. 3 is a representation of a display of a local device having a client window and a browser window.

Referring now to FIG. 3, there is shown the display 101 having a client window 200 and a browser window 300. The client window 200 is generated and controlled by the client application 110. The browser window is generated and controlled by the browser application 160, here Microsoft Internet Explorer. The browser window 300 is familiar to those skilled in the art, so the particulars are not described further herein. Further information regarding the use of most browser applications and their technical specifications is abundantly available.

The client window 200 includes a title bar 230, an advertising pane 210, a number of operational icons 205, 215, 220, 240, 250 on the title bar 230, and a number of button bar icons 260, 265, 270, 275 on a button bar 280. The title bar 230 preferably identifies the name of the OSP. The advertising pane 210 is a space in which the client application 110 displays advertisements.

The button bar icons 260, 265, 270, 275 preferably provide one-click access to Web pages and/or menus that might be useful to the user. The online service provider can sell the button bar icons to third parties as an additional revenue source. These icons 260, 265, 270, 275 are associated with particular URLs. The icon 260 is associated with a start page. The icon 265 is associated with an online shopping mall page. The icon 270 is associated with an online technical support page from the online service provider. The icon 275 is associated with an online search engine page. By clicking on any of these icons 260, 265, 270, 275, the client application 110 causes the browser application 160 to load the Web page having the URL associated with the selected icon.

The operational icons 205, 215, 240, 250, 280 on the title bar 230 preferably provide one-click access to operational features of the client application 110. As explained below, the client application 110 maintains records of the advertisements which have been displayed. The cycle back icon 205 allows the user to review advertisements which were previously displayed by the client application 110, in the reverse order in which the advertisements were displayed. If the user has cycled back through advertisements, the cycle forward icon 215 allows the user to review advertisements in the order in which the advertisements were displayed by the client application 110. The search icon 240 provides convenient access to online searching facilities. The close icon 250 causes the client window 200 to close, and thus also causes the session with the online service to terminate.

The menu icon 280 provides access to a menu of additional menu items and functions. The menu preferably provides alternative and enhanced access to the features associated with the button bar icons 260, 265, 270, 275 and the other operational icons 205, 215, 240, 250. In addition, the menu preferably provides the user with the ability to hide or show the title bar 230 and/or the button bar 280. The menu preferably also allows the user to access and edit his profile. The menu preferably provides the user with the option of positioning the client window 200 at any of a number of predefined positions, such as top left corner of the display 101, top right corner, bottom left corner, or bottom right corner.

The browser window 300 includes a display pane 310, an address bar 320 and a title bar 330. The display pane 310 is a region of the browser window 300 wherein the browser application causes web pages received by the browser application to be displayed. The address bar 320 is another region of the browser window 300 and the browser application displays URLs in the address bar 320 corresponding to the web page currently displayed in the display pane 310. The user can also enter a URL into the address bar 320, and the browser application will attempt to load the web page or other object to which the entered URL points. The primary feature of the title bar 330 is that it displays the title of the browser application. Another feature of most browsers is that the title bar 330 displays the title of the web page then displayed in the display pane 310.

The client window 200 is displayed on top of the browser window 300. Preferably, the client window 200 remains visible and on top of all other windows so long as the communication channel to the OSP server 130 is open. The client application 110 preferably can control the location of the client window 200 on the display 101. For example, the client application 110 preferably allows the user to select one of several predefined locations for the client window 200, such as lower left corner, upper right corner, etc. Some operating systems such as Microsoft Windows permit windows to be moved to the edge of the display 101 so that only a small portion of the window is visible. The client application 110 preferably can also prevent the client window 200 from being moved off of the visible area of the display 101. When the user attempts to hide all or a part of the client window 200, the client window preferably moves the client window 200 to a fully visible area of the display 101.

The Methods of the Invention

Figure 4:
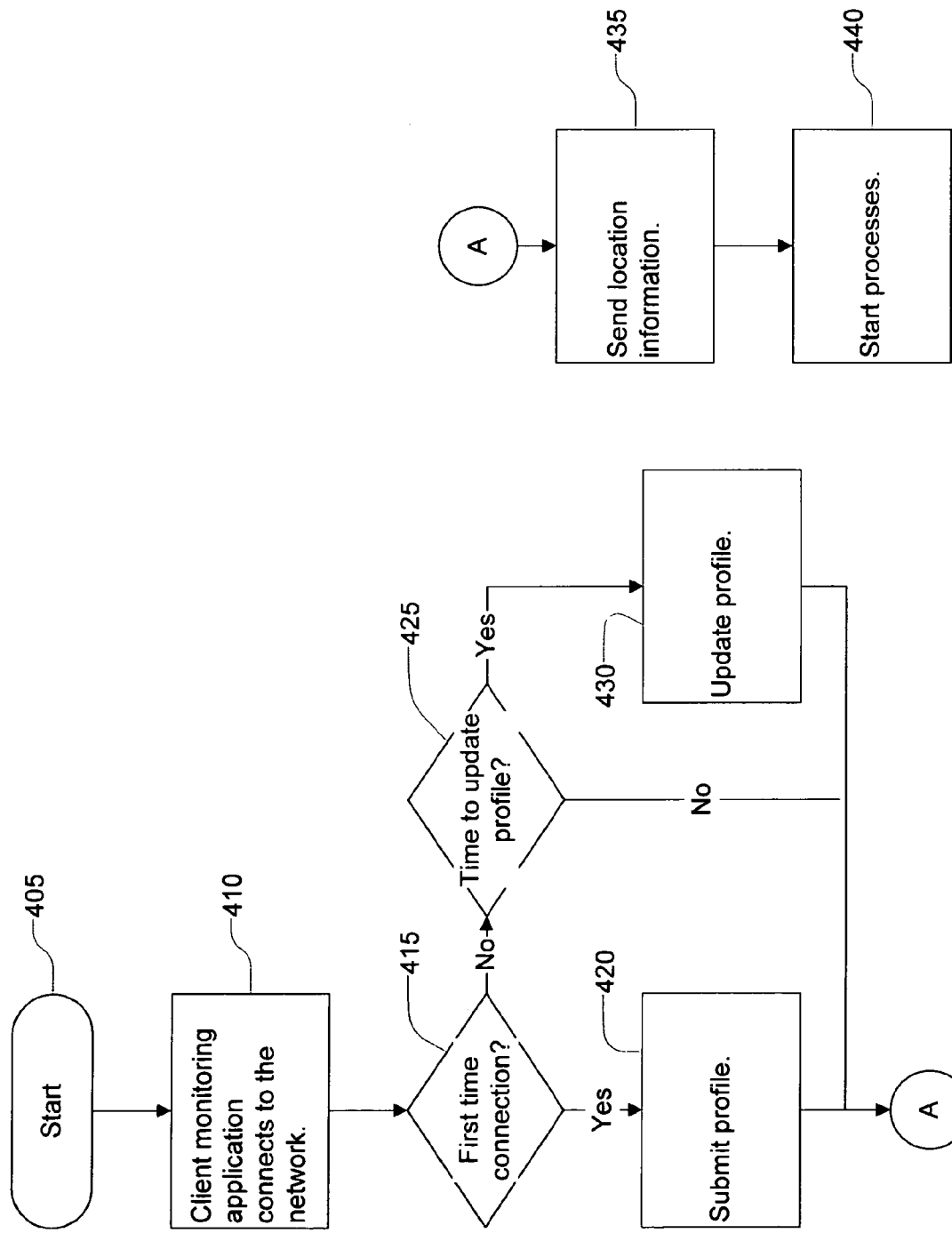
FIG. 4 is a flow chart of a method of monitoring web browsing by a user in accordance with the invention.

Referring now to FIG. 4, there is shown a flow chart of a method of distributing data in a network in accordance with the invention. The components 110, 120, 130, 140 work together to deliver data that meets the geographic and demographic criteria.

After the method begins (step 405), the user preferably uses the client application 110 to connect to the data access network 120, and then the OSP server 130 (step 410). The particular manner of the connection depends on the network infrastructure underlying the connections. The important aspect of this step 410 is that a communications channel is established between the client application 110 and the OSP server 130. By "communications channel," it is meant a logical path for data transmission. A logical data path or logical data link is defined as a communication path between two terminals across which data may be transmitted. The OSP server 130 preferably acts as a gatekeeper to the online services. Only after the OSP server 130 has authorized access can the local device 100 access the web server 150 and the other resources of the online service.

The communication channel may be of two varieties—dial-up or constant-connection. In a dial-up communication channel, the connection to the online service becomes available only after the local device 100 creates a physical link to the online network via a PSTN and then a logical link to the online network. For example, the local device 100 has a dial-up communication channel if the local device 100 has a modem and connects through tone dialing to the online service using the PSTN. In a constant-connection communication channel, the connection to the online service is always available to the local device 100, and the local device need only access a logical link to the online network. For example, the local device 100 has a constant-connection communication channel when the local device 100 has a cable modem and connects to the online service using a cable service. Digital subscriber lines (DSL), integrated services digital networks (ISDN), and fixed wireless connections are other examples of constant-connection communication channels.

If this is the first time the user has connected (step 415), then the OSP server 130 preferably requires the user to use the local device 100 to submit personal profile information (step 420). Preferably, the OSP server 130 periodically will request (step 425) that the client application 110 have the user update this profile (step 430).

The personal profile information is preferably maintained by the OSP server 130 within a user information record, referred to as a User Record, comprising a file that is stored in one of the data stores 140. The User Record preferably contains a plurality of data fields that each correspond to some informational aspect or demographic category associated with the user. A demographic category means any type of informational category this is used to define the user. In one embodiment, the User Record includes data fields that are associated with at least each of the following demographic categories for the user: name, age, gender, street address, state, country, zip code, income, occupation, education level, marital status, hobbies, and family size. The demographic categories may also relate to other user interests, such as sports interests and musical interests.

Each time the local device 100 connects to the OSP server 130, the OSP server 130 preferably obtains data indicating the local device's current geographic location (step 435). In the case of a dial-up connection, this geographic information is preferably derived from a local access phone number used by the client application 110 to connect to the data access network 120, and the client application 110 transmits its local access phone number to the OSP server 130 for geographic determination purposes.

Once connected, a number of processes are preferably started (step 440). In one of these processes, whenever the user interacts with data received on the client application 110, the client application 110 sends feedback information respecting this interaction to the OSP server 130. The OSP server 130 then summarizes and classifies the feedback information into demographic profiles stored in the data store 140.

In another of these processes, whenever a user uses the browser application 160 to request or access data from the web server 150, the client application 110 sends feedback information respecting these requests and data accesses to the OSP server 130. The OSP server 130 then summarizes and classifies this feedback information into the demographic profiles in the data store 140.

In another of these processes, while a user's local device 100 is connected to the web server 150, the OSP server 130 determines which targeted data needs to be sent to the client application 110 and then transmits this targeted data to the client application 110. The OSP server 130 accomplishes this by:

examining the scheduling requirements to determine which data needs to be sent;

examining the demographic requirements of the data to determine to which demographic profiles the data needs to be sent;

selecting the users who are currently connected that meet the demographic requirements of the data; and sending the data to the selected users.

As mentioned, one of the processes relates to the display of data, and particularly advertisements, in the client window 200. Methods of displaying advertisements to a user of an online services are described next.

Figure 5:
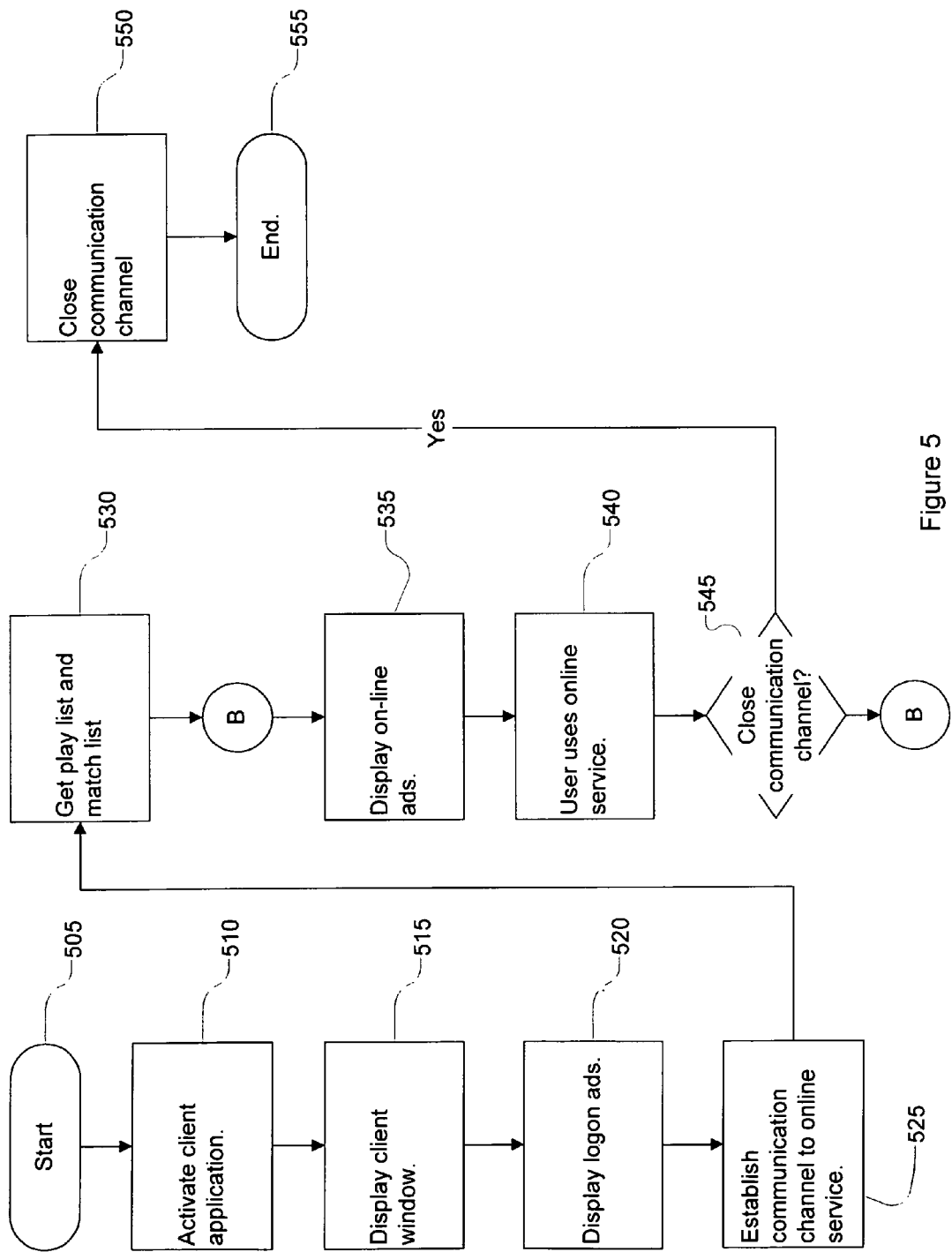
FIG. 5 is a flow chart of a method of displaying advertisements to a user of an online service in accordance with the invention.

Referring now to FIG. 5, there is shown a flow chart of a method of displaying advertisements to a user of an online service in accordance with the invention. This method generally involves the display of advertisements during a logon process and then also during usage of the online service.

After the method begins (step 505), the client application is activated (step 510). The client application 110 may be installed during manufacture of the local device 100, during use of the local device 100 at the instigation of the user, or may occur automatically as a consequence of other processes. Furthermore, the client application 110 may be activated either manually or automatically. Although at least some aspects of the client application 110 should be operable from the local device 100, the client application 110 need not be stored on the local device 100 and can be run from a remote location.

Preferably, after the client application 110 is activated, the client application 110 displays the client window 200 on the display 101 (step 515). In the next step (step 520), the client application 110 displays advertisements in the ad pane 210. In the case of dial-up and constant-connection communication channels, the communication channel to the online service might not yet be established or fully open at this point. Thus, the client application 110 cannot obtain the advertisements from the online service. Instead, the client application 110 obtains the advertisements locally. For example, during installation of the client application 110 one or more advertisements are installed on the local device 100 for display outside of a session. Alternatively, the advertisements may be downloaded to the local device at the beginning of a session, during a session, or as part of the termination of a session. One or more of these advertisements may be displayed during connection, or as the initial ("marquis") advertisements displayed upon connection.

Where it is not desired to display advertisements prior to full establishment of the communication channel, then it is preferred also that the ad pane 210 not be displayed. In such embodiments, it might be desirable to provide a different configuration of the client window 200 than that shown in FIG. 3. For example, the client window 200 might show the status of the connection process.

The client application 110 preferably includes an ad display process which is responsible for displaying sponsored advertisements in the ad pane 210. A sponsored advertisement comprises an advertisement that an online service provider displays in the client window 200 on behalf of a sponsor. The ad display process preferably operates in accordance with a play list. The play list comprises one or more ad objects. The ad objects are preferably data constructs which each include a resource locator of an advertisement to be displayed, a resource locator to be accessed if the user clicks on (or otherwise selects) the advertisement when displayed in the ad pane 210, and a number of attributes for the display of the advertisement. The display attributes may be one or more of, for example: fade, wash, sweep, fly, blinds, box, checkerboard, crawl, dissolve, peak, spiral, split, stretch, strips, swivel, wipe, zoom. These types of display attributes are well known (though not necessarily with respect to online services) and are therefore not described further herein. The ad objects preferably also specify how long the advertisement should be displayed. Other display attributes are within the scope of the invention. The play list preferably specifies an order in which the advertisements identified in the play list are to be displayed. As an alternative to displaying advertisements in accordance with a play list, the client application is preferably also configured to display advertisements on an individual basis apart from the play list.

Preferably, an advertisement sponsor can specify the amount of time that its advertisement is displayed before the play list proceeds to the next consecutive advertisement. The sponsor preferably can also specify a preference in the location that its advertisements are located in the play list rotation.

As mentioned, each advertisement is associated with an advertisement sponsor. Each ad object preferably includes a sponsor identifier code that is used to identify the sponsor that is associated with the advertisement.

Typically, advertisements in the online industry are associated with a resource locator, and more typically with a URL. As is well known, when a user uses an input device, such as the pointing device 103, to click or otherwise select on an online advertisement in a browser's window such as browser window 300, the browser application loads the resource at the associated URL. This is commonly known as "click-through." In accordance with the invention, if during the display of an advertisement in the ad pane 210, the user clicks-through on the advertisement, then the client application 110 causes the resource locator associated with the advertisement to be loaded by the browser application 160. If the browser application 160 is not open at the time, then the browser application is first opened and then pointed to the resource locator associated with the advertisement. If the resource locator is not for a web page, the client application 110 or some other software in the local device 100 preferably causes the appropriate application to open so that the resource locator may be opened.

Preferably, the client application 110 displays advertisements from the time that the client application 110 is activated. To accomplish this, the client application 110 preferably is provided with a logon play list for use before the communication channel with the OSP server 130 is open. The client application 110 preferably is also provided with the advertisements referenced in the logon play list. The logon play list is preferably stored on the local device 100 during installation of the client application 110. Subsequently, during each session with the online service, the OSP server 130 provides a new logon play list and the advertisements referenced by the new logon play list to the client application 110 for use by the client application 110 during the next logon. The OSP server 130 can transmit the new logon play list in any of several ways, such as part of establishment of the communication channel to the OSP server 130, during the user's session with the online service, or as part of the closing of the communication channel. The latter is preferred, since it proves the online service provider with the best targeting control.

It should also be appreciated that, where there is a constant-connection communication link, a logon play list can be communicated from the OSP server 130 to the client application 110 at any time. Similarly, in some dial-up environments, such as ISDN, a logon play list can be communicated from the OSP server 130 to the client application 110 at any time using signaling channels or other off-line means.

In the next step (step 525), the client application 110 establishes a communication channel to the online service. With the communication channel established, the client application 110 can now receive a new play list from the OSP server 130 (step 530). This online play list can reference advertisements which are in the data access network 120. In some embodiments, it may be desirable for the OSP server 130 to transmit additional or replacement play lists and/or ad objects to the client application 110.

The client application 110 preferably also receives from the OSP server 130 a match list. The match list comprises one or more match objects. The match objects each comprise an activity identifier and an ad object. The match list guides the client application 110 to display certain advertisements notwithstanding the play list. The activity identifier preferably comprises resource locators and keywords which are used for targeting advertising to the user. The activity identifier may also be an object which altogether describes an online activity in which the user may become involved, such as email or chat.

During the user's session with the online service, the client application 110 preferably monitors the user's interaction with the data access network 120. If the user's interaction with the network matches one of the activity identifiers in the match list, then the ad display process displays the advertisement of the ad object corresponding to the matched activity identifier. Methods for monitoring the online activities of an online user are described in the related application referenced above.

The client application then displays advertisements in accordance with the on-line play list and the match list (step 535), and this continues while the user uses the online service (step 540).

As an example of the use of the match list, if the user points his browser application 160 to a Web site which the online service provider has previously identified to relate to sale of automobiles, then the online service provider preferably would run an advertisement targeting a potential purchaser of an automobile. The Web site may be identified from its URL, and if the URL is an activity identifier in the match list, the client application 110 can cause the appropriate advertisement to be displayed.

As another example, the user might go to a search engine which is known to the online service provider, and search for information about the sale of automobiles based upon the keywords "automobile sales." The client application 110 preferably checks if the keywords sent to these selected search engines are activity identifiers in the match list. If so, then the client application 110 preferably displays the appropriate advertisement.

At some point, the user's online session will end. To manually close the session, the user can select icon 250 in the client window 200 (FIG. 2). The client application 110 preferably provides the user with the opportunity to confirm the closing of the session (step 545). If the user cancels closure, then the method continues at step 535. If the user confirms closure, then the client application 110 closes the communication channel to the online service (step 550), and the method ends (step 555).

In addition to manual closure, the client application 110 preferably can automatically close the communication channel. In the case of a dial-up connection, the client application 110 preferably can detect inaction by the user. This inaction may be with respect to the data access network 120, or more preferably, with respect to the client application 110. If the user has been inactive for a predetermined period of time, then the client application 110 preferably displays a dialog on the display 101 in which the user is given some period of time to request that the session be continued.

In the case of a constant-connection communication channel, the client application 110 preferably monitors the user's activity with the local device 100 with respect to the online service and thereby detects whether the user is interacting with the online service. Like a screen saver in reverse, the client application 110 detects some period of inactivity and causes the client window 200 to be closed. Alternatively, the client window 200 could remain on the display even when the user's session is terminated, but the client application 110 would allow other windows to be displayed on top of the client window 200. If the user desired to open a session with the online service, the client window 200 would again have to be on top of all other windows, either through automatic or manual means.

As can be seen, this process permits browsing by the user and displaying of advertisements by the client application 100 without interfering with the user's use of the browser application.

Figure 6:
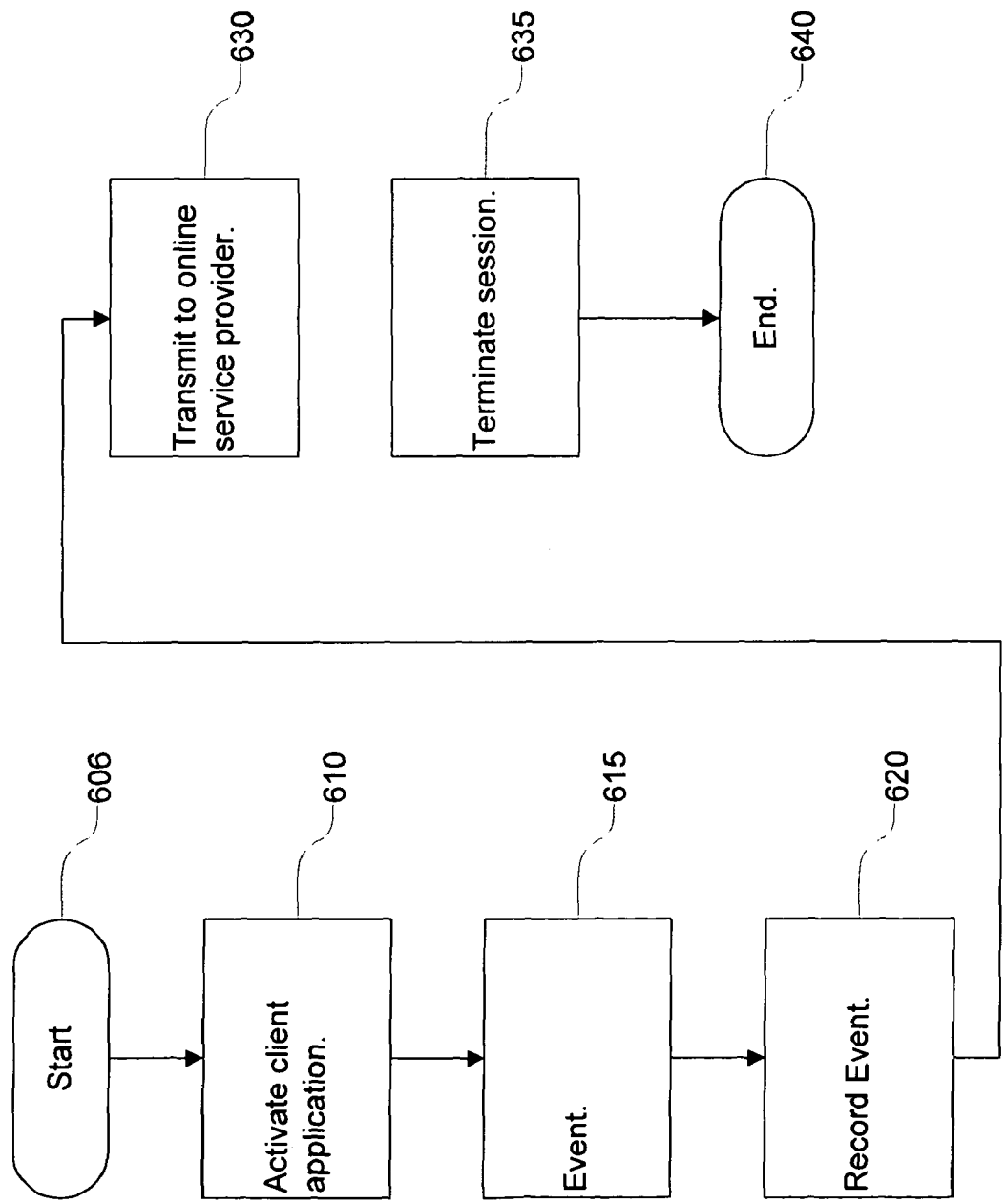
FIG. 6 is a flow chart of a method of tracking advertisement-related events in accordance with the invention.

In addition to the display of advertisements, the client application 110 preferably records a number of types of events and transmits these records to the OSP server 130. Tracked events fall into three categories: connection events, advertising events, and operational events. Referring now to FIG. 6, the event tracking capabilities of the client application 110 are described. Event tracking begins after the client application 110 is activated (step 610). After an event occurs (step 615), as described further below, the client application stores an event record (step 620). At a time appropriate for the event record, the client application 110 transmits the event record to an interactive data server such as the OSP server 130 (step 630). This continues until the session is terminated (step 635).

The connection events include failed connection attempts, such as when the client application 110 attempted a dial-up session and encountered no dial tone, a busy signal, or some other error from the physical network. The connection event records allow the online service provider to better understand where the users are experiencing difficulties, and to therefore remedy problems and enhance operations without necessitating user feedback. This is important because the connection event records may provide more timely and accurate information about a user's experiences, and further allows the online service provider to diagnose problems based upon common characteristics of users who have had problems.

The advertising events relate to the display of advertisements by the client application 110. Each time the client application 110 displays an advertisement (commonly referred to as an "impression"), the client application 110 preferably records an identifier of the advertisement. These records are used by the client application 110 to permit the user to cycle back through previously displayed advertisements, and then to cycle forward through the advertisements. Cycle-back and cycle-forward is made available to the user, for example, through the cycle-back icon 205 and the cycle-forward icon 215. The client application 110 preferably also records errors encountered in attempting to fetch and display advertisements.

In accordance with the invention, special attention is given to the user's selection of advertisements in the ad pane 210. To track the effectiveness of advertisements displayed in the ad pane 210, the client application 110 preferably tracks not only click-throughs, but also how long the client application displays an advertisement before the user clicks-through. This information, as well as records of what Web sites the user has browsed, are preferably used by the online service provider to enhance advertisement targeting criteria, to enable dynamic advertisement targeting, and to track the performance of advertisements displayed in the ad pane 210.

The operational events relate to the user's use of certain features of the client application 110. The operational events thus include attribute settings such as whether the user has hidden the title bar 230 and/or the button bar 280, and where the user has placed the client window 200 on the display 101. The client application 110 further recognizes as events each icon 205, 215, 240, 250, 260, 265, 270, 275, 280 which the user has selected (clicked-on). These operational event records allow the online service provider to better understand how the users are using the online service and to therefore enhance the quality of the client application 110 and the user's online experience.

In general, the client application 110 transmits most types of event records in a batch form. The online service provider preferably specifies the number of events to record before transmitting the event records, and this number preferably may be adjusted during a session. However, some event records should be transmitted without delay—most notably click-throughs. Click-throughs are not batched because the fact of these events is preferably used by the OSP server for refinement of dynamic advertisement targeting.

Figure 7:
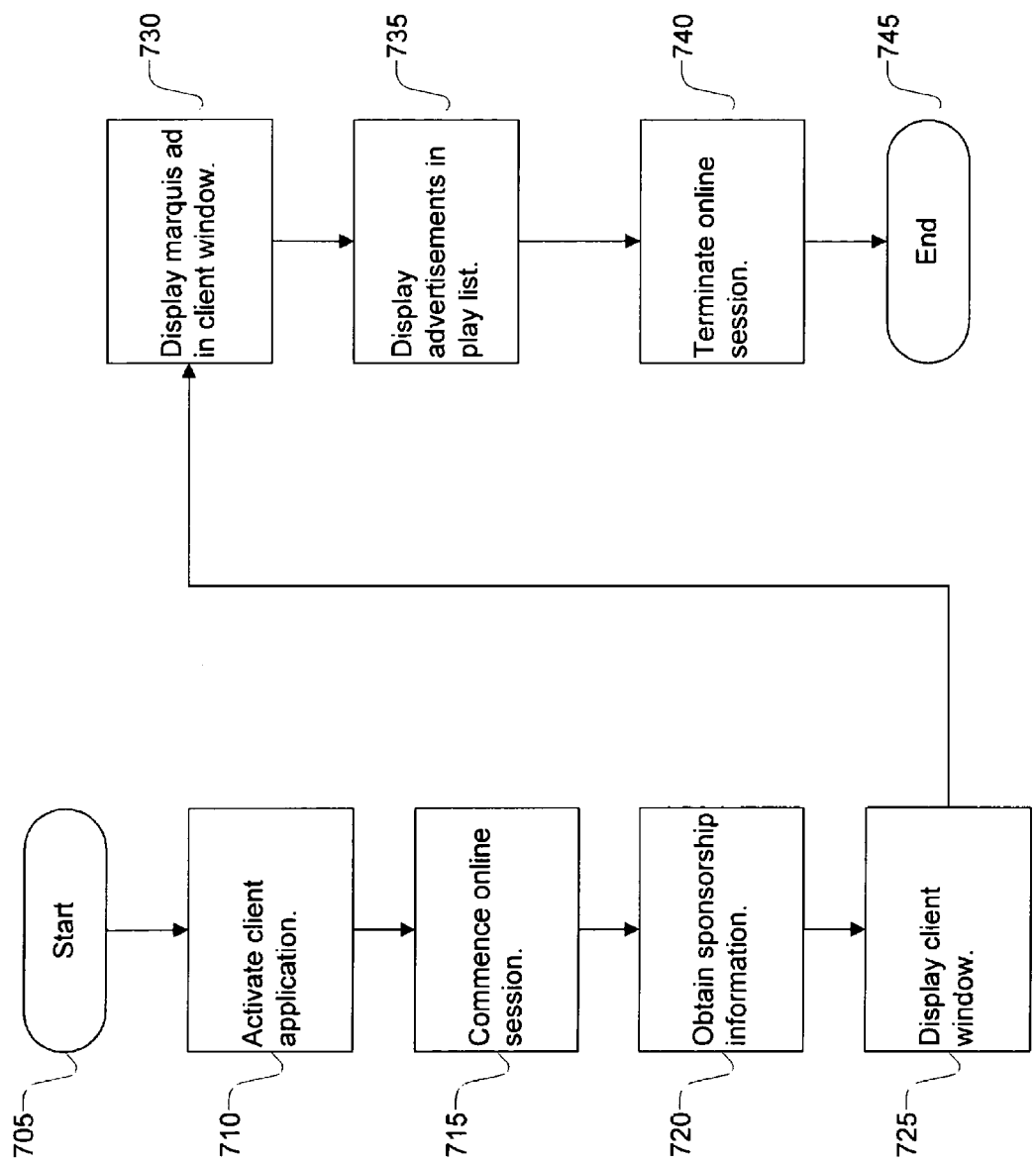
FIG. 7 is a flow chart of a method of displaying sponsorship information in accordance with the invention.

In addition to displaying sponsored advertisements, the client application 110 is also configured to display sponsorship information with respect to various other aspects of the user's online session. FIG. 7 shows a flow chart that describes a process wherein sponsorship information is displayed to the user during an online session. The process begins when the user activates the client application 110 (step 710). The user's online session then commences (step 715). In the case of a dial-up connection, an online session commences when the client application 110 establishes a communication channel via a PSTN from the local device 100 to the OSP server 130. The online session terminates when the communication channel is closed, or when the client application "hangs up" the connection.

In a constant-connection communication channel, the client application 110 does not actually create or terminate the communication channel, which is always on. For a constant connection, establishment of a communication channel preferably comprises the client application 110 transmitting a request to the OSP server 130 to authorize the local device 100 to interact with the web server 150. When activated, the client application preferably automatically transmits such a request. The online session commences when the client application 110 transmits the request and the OSP server 130 provides the authorization for the local device to interact with the web server 150. The online session terminates when the OSP server 130 removes such authorization, preferably at the request of the user through the client application 110.

In step 720, the client application 110 obtains sponsorship information from the OSP server 130. In one embodiment, the OSP server 130 provides the client application 110 with data related to one or more sponsorship objects. Each sponsorship object includes a resource locator associated with a sponsorship label 722 (FIG. 8) to be displayed, as described below. The sponsorship object further comprises a resource locator to be accessed when a user clicks-through the sponsorship label 722. The data preferably also includes attributes associated with the display of the sponsorship label, including the location where the sponsorship information is displayed during the online session and the aspect of the online session with which the sponsorship is associated. Preferably, any aspect of the online session can be sponsored, such as search sessions or the termination of the online session. In one embodiment, the client application displays sponsorship information with respect to the client window 200, as described below.

Figure 8:
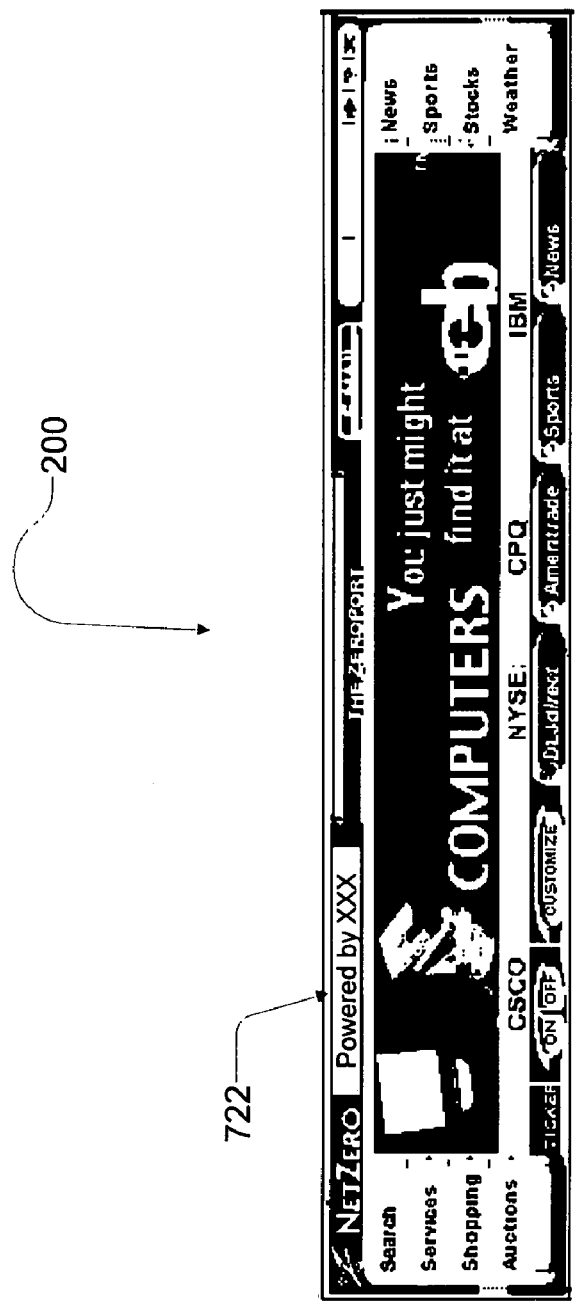
FIG. 8 is a representation of a client window including an exemplary sponsorship label.

The client application 110 next causes the client window 200 to be displayed on the display 101 (step 725). With reference to FIG. 8, the client window 200 includes a sponsorship label 722 that indicates a current sponsor of the client window 200. The sponsorship label 722 is preferably prominently displayed on the title bar 230. The sponsorship label 722 preferably comprises a hypertext link. If the user clicks on the hypertext link, the client application 110 causes the local device 100 to access the resource locator associated with the click-through of the sponsorship label 722. The hypertext link is preferably associated a web site uniform resource locator for the sponsor.

The sponsorship label 722 preferably provides an indication to the user that the client window 200 is sponsored by an advertiser. For example, in the illustrated embodiment, the sponsorship label 722 includes the words "powered by" followed by includes the name of the sponsor.

After the client window 200 has been displayed, the client application 110 immediately causes an advertisement to be displayed in the client window 200. The first advertisement that is displayed is preferably a marquis advertisement, which comprises a single advertisement that is stored locally in a cache memory. This reduces the amount of time required for the local device 100 to access and display the marquis advertisement. The online service provider preferably receives information from advertisers regarding the configuration of each marquis advertisement, which preferably is not part of the play list. The marquis advertisement is preferably not targeted toward any particular user. Rather, the marquis advertisement is displayed to every user upon commencement of an online session. The sponsor of the marquis advertisement is thereby guaranteed that the advertisement is the first advertisement that is displayed to the user when the session commences.

The marquis advertisement is displayed in the client window 200 for a predetermined amount of time. After the marquis advertisement is displayed, the client application 110 commences the display of advertisements in accordance with a play list (step 735) which is downloaded from the OSP server 130. The marquis advertisement preferably is displayed immediately when the client window 200 is opened to eliminate any downtime that might otherwise be exhibited while the client application 110 is downloading the play list.

The client application 110 preferably continually displays advertisements while the user is proceeding with the online session. The process ends when the user terminates the online session (step 745).

Figure 9:
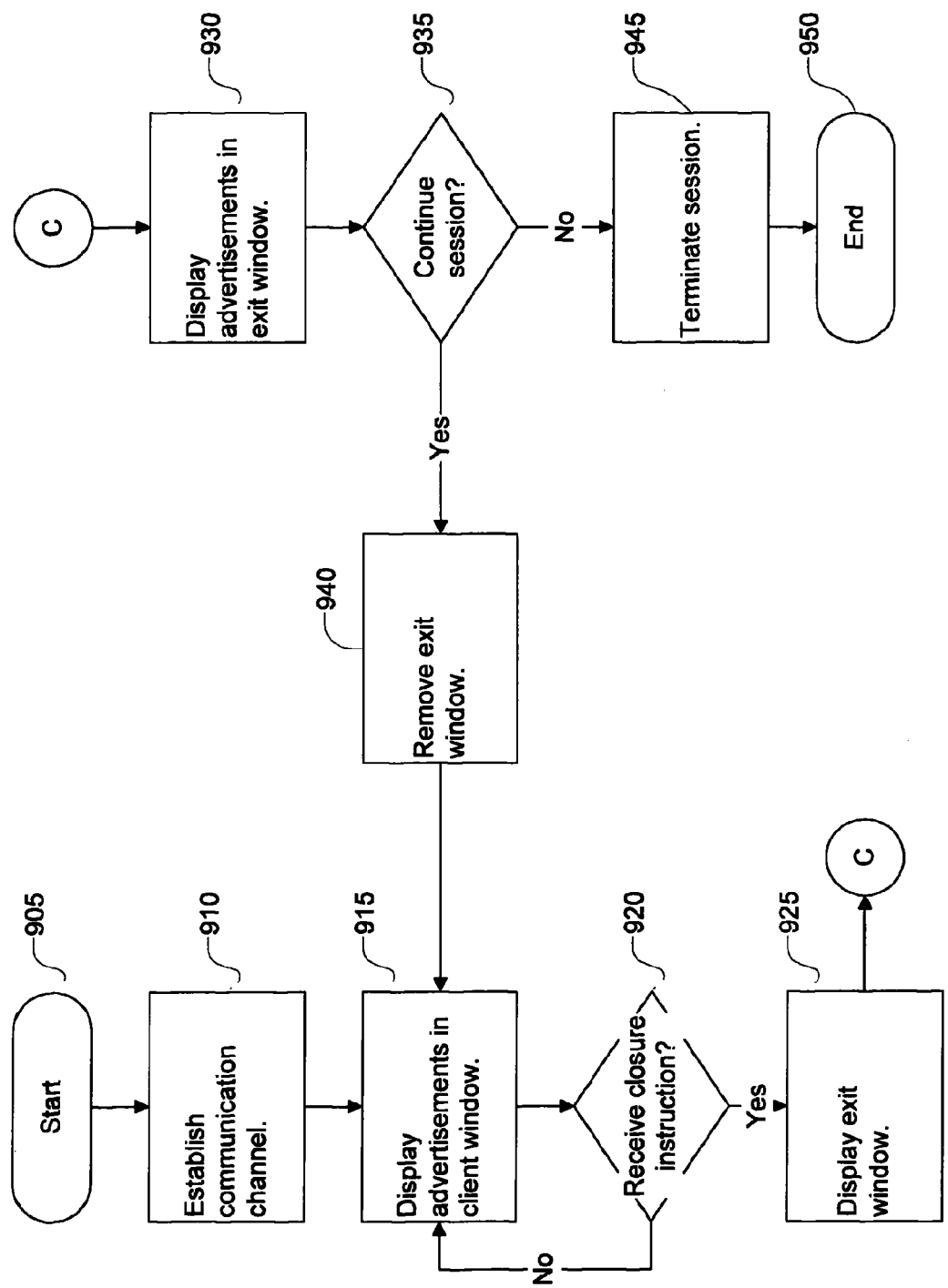
FIG. 9 is a flow chart of a method of displaying advertisements within an exit window upon termination of an online session in accordance with the invention.
Figure 10:
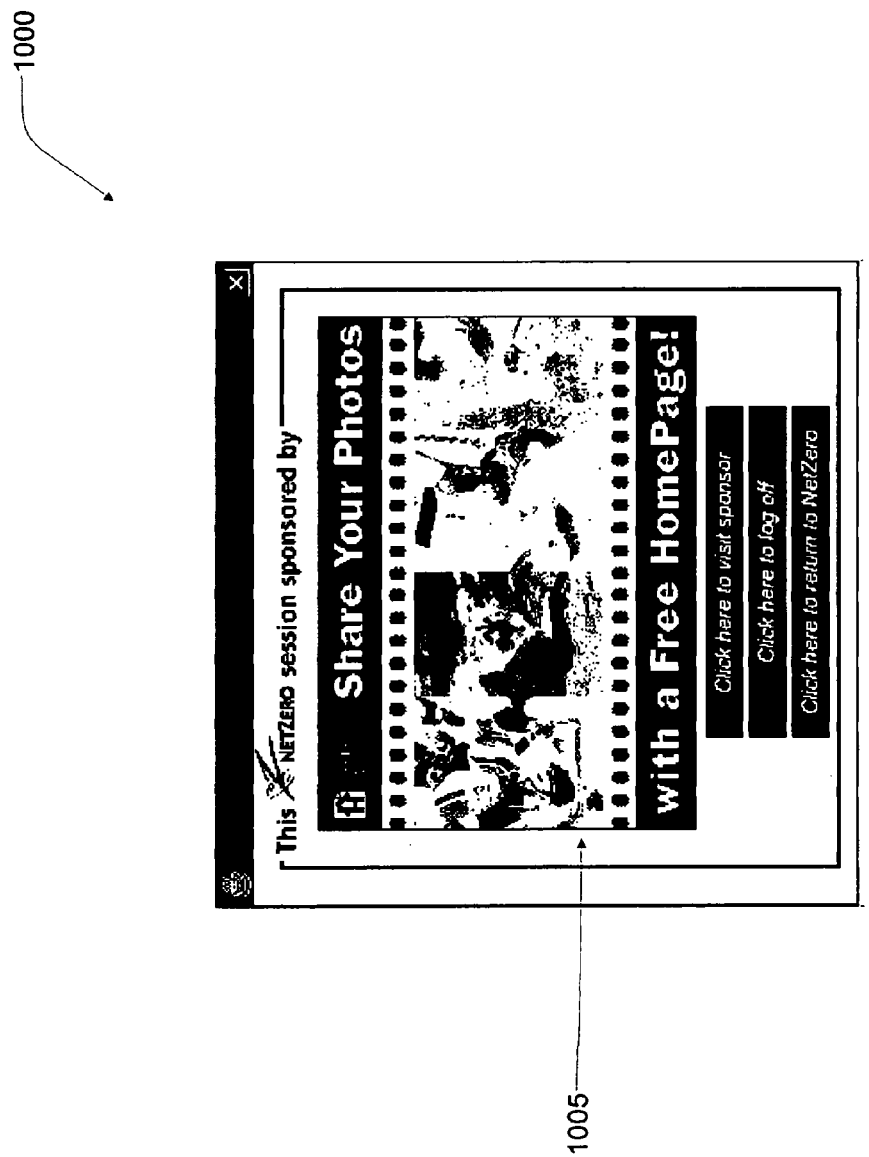
FIG. 10 shows an exemplary exit window including an exit window advertisement.

The client application 110 preferably displays an exit window 1000 (FIG. 10) in conjunction with termination of the online session. FIG. 9 shows a flow chart that describes a process wherein advertisements are displayed within the exit window 1000. The process is initially described with respect to a dial-up connection communication channel and described further below with respect to a constant-connection communication channel. The process begins when the client application 110 establishes a communication channel from the local device 100 to the OSP server 130 (step 910).

In step 915, the client application 110 causes advertisements to be displayed in the client window 200 on the display 101. The client application 110 preferably displays the advertisements in accordance with a play list, as described above with respect to FIG. 5. In another embodiment, the client application 110 displays advertisements apart from the play list. The client application 110 preferably continually displays advertisements in the client window 200 while the communication channel remains open.

At some point during the online session, the client application 110 receives instruction from the user to terminate the online session, such as by closing the communication channel (step 920). The user preferably instructs the client application to terminate the session by clicking on or otherwise selecting an exit button on the client window 200.

Upon receiving instruction to terminate the online session, the client application causes the exit window 1000 (FIG. 10) to be displayed on the display 101 (step 925). The exit window 1000 is preferably displayed on top of any other window that is currently open on the display 101. The exit window 1000 includes a sponsorship or advertisement box 1005 where one or more sponsored, exit window advertisements are displayed (step 930). The exit window advertisements are preferably associated with a resource locator to be accessed if the user clicks on or otherwise selects the advertisement in the exit window 1000. The advertisement box 1005 preferably consumes a prominent portion of the exit window 1005 to increase the likelihood of the associated advertisement catching the user's attention. The advertisement box 1005 may take on any of a wide variety of shapes and sizes.

The exit window advertisements are preferably displayed in accordance with a separate, exit window play list that is specially dedicated to the exit window 1000. The exit window play list is preferably identically constructed to the play list described above with respect to FIG. 5, except that the advertisements in the exit window play list are initially displayed in the exit window 1000 rather than the client window 200. The online service provider can therefore charge a separate fee for displaying advertisements in the exit window 1000 apart from displaying advertisements in the client window 200.

The advertisements in the exit window play list are preferably sequentially displayed in the advertisement box 1005 according to the order of the advertisements in the play list. In one embodiment, each advertisement in the play list is displayed in the advertisement box 1005 for a predetermined time span while the exit window remains displayed. The user is therefore exposed to plural advertisements while a single exit window 1000 remains open. In another embodiment, only a single advertisement in the play list is displayed while the exit window 1000 is open. The next consecutive advertisement in the play list is not displayed until the exit window 1000 is again re-opened. This provides a maximum exposure time for each advertisement in the exit window play list.

In a preferred embodiment, the client application 110 or the OSP server 130 initiates the display of a single, targeted exit window advertisement in the exit window 1000. A targeted exit window advertisement comprises an advertisement that is selected for display in the exit window 1000 based upon a best fit-match between the user and a group or pool of plural exit window advertisements. The OSP server 130 preferably performs a best fit-analysis between the user and the available advertisements and determines which advertisement is particularly suited for the user. In performing the best-fit analysis, the OSP server uses all available information about the user, including the information in the user record, such as the user's interests, hobbies, age, income, salary, marital status. It will be appreciated that other devices, such as the local device 100, may also be used to perform the best-fit analysis.

In performing the best-fit analysis, the OSP server 130 preferably also considers the user's usage history with the online service. The usage history preferably comprises a file that includes a summary of the types of subject matter that the user accessed or downloaded during the user's current and past online sessions, as monitored by the OSP to server 130 and/or the client application 110. The OSP server 130 and the client application 110 assemble the user's usage history by monitoring the user's interaction with the client application 110 and the browser application 160. The OSP server 130 and the client application 110 preferably record the type or subject matter of information that the user accesses or downloads with respect to web sites and web searches. This may be accomplished in accordance with the methods described in related patent application "Monitoring of Individual Internet Usage."

In one embodiment, the targeted exit window advertisement is selected based solely on the usage history compiled during the current online session, as monitored by the OSP server 130 and/or the client application 110. That is, the OSP server 130 compares the subject matter of user's usage history for the current online session with the subject matter of available advertisement. The OSP server 130 then selects the exit window advertisement based upon the comparison. This increases the likelihood of the exit window advertisement being particularly relevant to the user's most immediate interests and thereby entices the user to click on the exit window advertisement and continue the online session. For example, if, during the current online session, the OSP server 130 or the client application 110 determines that the user accessed web pages or performed several searches related to travel, the OSP server 130 preferably selects a targeted exit window advertisement that is closely related to travel.

After the targeted exit window advertisement is selected, the OSP server 130 preferably transmits an instruction to the client application to display the exit window advertisement in the advertisement box 1005 of the exit window 1000.

The exit window 1000 preferably provides the user with an option to continue the current online session rather than terminating the online session (step 935). Toward this end, the exit window 1000 preferably provides a textual and/or audio inquiry for the user, such as "Continue with online session?" or "Click here to continue with NetZero." The client application 110 preferably then requires the user to confirm termination of the online session, such as by clicking on a confirmation button with an appropriate label such as "Click here to log off." The exit window 1000 preferably also includes means by which the user can elect to continue the online session by clicking on a button associated with the exit window advertisement sponsor.

If the user elects to continue with the online session by clicking in the confirmation button, then the client application 110 removes the exit window 1000 from the display 101 (step 940). The process then returns to step 915, where the client application 110 continues to display advertisements in the client window 200 (step 915). The client application 110 preferably pauses the play list while the exit window 1000 is displayed. The client application then continues the play list from the pause point after the exit window 1000 is removed from display. Alternately, the client application 110 may request download of a new play list when the exit window 1000 is removed from display.

The user can also cancel termination of the online session by clicking on the exit window advertisement. Preferably, if the user clicks on the exit window advertisement, the client application 110 automatically removes the exit window 1000 from the display 101 (step 940) and automatically cancels termination of the online session. The client application 110 then automatically causes a resource locator associated with the exit window advertisement to be loaded in the browser window 300. Additionally, the client application 110 preferably displays the exit window advertisement in the client window 200 after the exit window is removed. After the exit window advertisement is displayed in the client window 200 for a predetermined time span, the client application 110 continues the play list or downloads a new play list.

If the user does not elect to continue the online session, then the client application 110 terminates the online session by closing the communication channel, such as by hanging up the telephone line connection (step 945). As mentioned, the user can manually confirm closure of the communication channel by clicking on the confirmation button on the exit window 1000. Preferably, the client application 110 automatically terminates the session if the user does not interact with the exit window 1000 within a predetermined time span. Such inactivity generally indicates that the user is no longer interacting with the online service. This preferably prevents the exit window advertisements from being displayed while the user is not using the online service.

The aforementioned description of the process shown in FIG. 9 was described with respect to a dial-up connection communication channel. In a constant-connection communication channel, the client application 110 does not actually create or terminate the communication channel, which is always on. Rather, the online session terminates (step 945) when the OSP server 130 removes such authorization. For a constant connection communication channel, the client application 110 preferably displays the exit window 1000 and initiates the process shown in FIG. 9 prior to termination of an online session.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of displaying advertisements to a user of an online service provider using a client application on a local device, the local device including an input device and an output device, the client application accessing an online server associated with the online service provider and providing access to the Internet, the method comprising:

a) the client application activating;

b) the client application commencing an initial online session with the online service provider to gain access to the Internet, the client application operating independently of an Internet browser and operating concurrently with the Internet browser;

c) the client application receiving sponsorship data from the online service provider, the sponsorship data comprising a sponsorship object including a resource locator associated with a sponsorship label to be displayed and a resource locator associated with a click-through of the sponsorship label;

d) the client application causing a client window to be displayed on the output device, the client window remaining fully visible so long as the online session with the online service provider persists, wherein the client window is displayed independently of a browser window generated by the Internet browser;

e) the client application displaying a sponsorship label on the client window by referring to the resource locator associated with the sponsorship label to be displayed, the sponsorship label comprising a hypertext link, wherein, when the user clicks on the sponsorship label, the client application causes the local device to access the resource locator associated with a click-through of the sponsorship label;

f) the client application causing a first advertisement to be displayed in the client window, wherein the client application retrieves the first advertisement from a memory cache local to the local device;

g) the client application receiving a second advertisement from the online server;

h) the client application causing the second advertisement to be displayed in the client window.

2. The method of displaying advertisements to a user of an online service provider using a client application on a local device of claim 1, wherein the client application commences the initial online session by establishing a communication channel via a public switched telephone network from the local device to the online server.

3. The method of displaying advertisements to a user of an online service provider using a client application on a local device of claim 1, wherein the client application commencing an initial online session comprises:

a) the client application transmitting a request to the online service provider to authorize the local device to interact with a web server;

b) the client application receiving from the online service provider authorization for the local device to interact with the web server.

4. The method of displaying advertisements to a user of an online service provider using a client application on a local device of claim 1, wherein the resource locator associated with the click-through of the sponsorship label comprises a uniform resource locator associated with an Internet web page.

5. The method of displaying advertisements to a user of an online service provider using a client application on a local device of claim 1, wherein the sponsorship label is located on a title bar of the client window.

6. The method of displaying advertisements to a user of an online service provider using a client application on a local device of claim 1, wherein the second advertisement is included within a play list comprising at least one ad object, each ad object comprising a resource locator for a given advertisement, a resource locator for a click-through associated with the given advertisement, and at least one display attribute for the given advertisement, the play list further specifying an order in which the advertisements identified in the play list are to be displayed.

7. A method of displaying sponsorship information to a user of an online service provider using a client application on a local device, the local device including an input device and an output device, the client application accessing an online server associated with the online service provider and providing access to the Internet, the method comprising:

a) the client application activating;

b) the client application commencing an online session with the online service provider, the client application operating independently of an Internet browser and operating concurrently with the Internet browser;

c) the client application receiving sponsorship data from the online service provider, the sponsorship data comprising a sponsorship object including a resource locator associated with a sponsorship label to be displayed;

d) the client application causing a client window to be displayed on the output device, the client window remaining fully visible and on top of all other windows so long as the online session with the online service provider persists, wherein the client window is displayed concurrently with a browser window generated by the Internet browser;

e) the client application causing the sponsorship label to be displayed on the client window, the sponsorship label comprising a hypertext link to be accessed if a user clicks on the sponsorship label;

f) the client application retrieving a first advertisement from a memory cache local to the local device;

g) the client application causing the first advertisement to be displayed in the client window.

8. The method of displaying advertisements to a user of an online service provider using a client application on a local device of claim 7, additionally comprising the online service provider transmitting a second advertisement to the local device and the client application causing the second advertisement to be displayed in the client window.

9. The method of displaying advertisements to a user of an online service provider using a client application on a local device of claim 7, wherein the client application commences the online session by establishing a communication channel via a public switched telephone network from the local device to the online service provider.

10. The method of displaying advertisements to a user of an online service provider using a client application on a local device of claim 7, wherein the client application commencing an online session comprises:

a) the client application transmitting a request to the online service provider to authorize the local device to interact with a web server;

b) the client application receiving from the online server authorization for the local device to interact with the web server.

* * * * *